J. D. WARD.
Thermometer.
No. 110,314.
Patented Dec. 20, 1870.
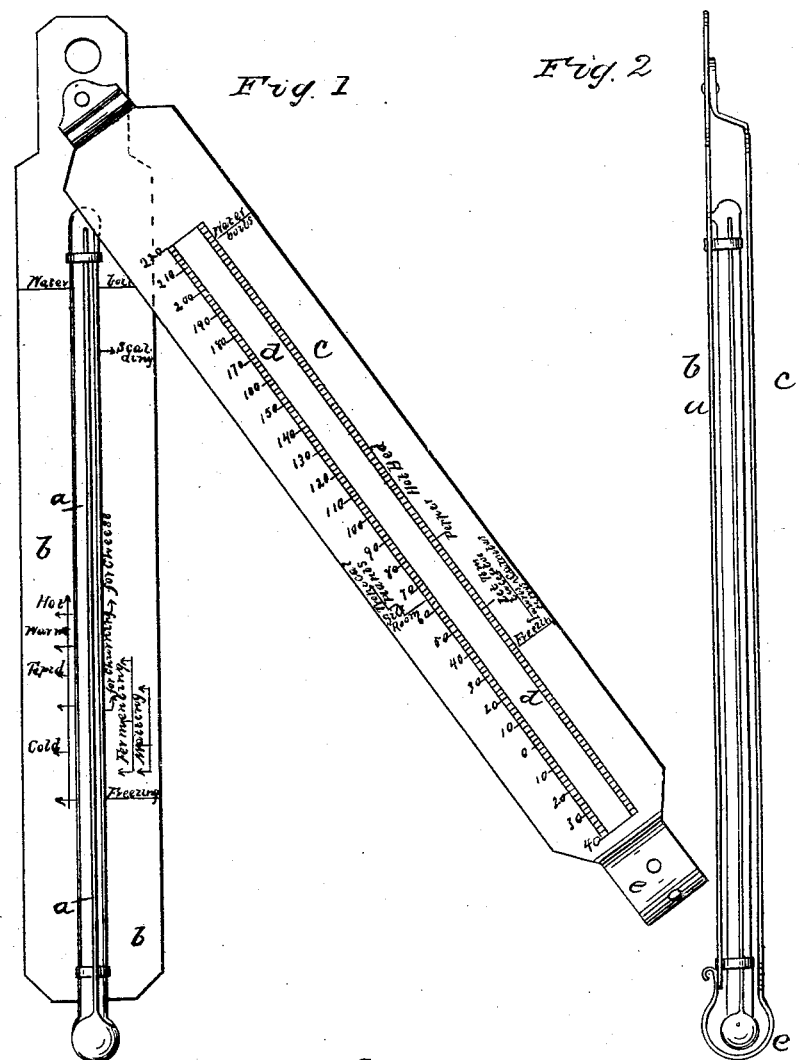

United States Patent Office.

JOHN D. WARD, OF BALTIMORE, MARYLAND, ASSIGNOR TO HIMSELF AND WILLIAM F. JONES.

Letters Patent No. 110,314, dated December 20, 1870.

IMPROVEMENT IN THERMOMETERS.

The Schedule referred to in these Letters Patent and making part of the same.

*To all whom it may concern:*

Be it known that I, JOHN D. WARD, of Baltimore, in the county of Baltimore and State of Maryland, have invented a new and useful Improvement in Thermometers; and I do hereby declare the following to be a full, clear, and exact description of the same, reference being had to the accompanying drawing making a part of this specification, in which—

Figure 1 is a side elevation, showing the back plate and thermometer, with the front plate swung aside, and Figure 2 is an elevation showing the edges of the plates, with the thermometer between.

The object of my invention is improvement in thermometers, and consists in so combining with the ordinary thermometer a supplementary plate bearing a different scale that either may be conveniently used, and the two shall, when properly adjusted, inclose and protect the mercury-tube.

This result is attained without increasing the cost of the instrument, and with a lessening of weight and thickness as compared with the ordinary thermometer.

Referring to the drawing—

$a$ is an ordinary thermometer.

$b$ is the plate to which the thermometer is secured, on which plate is inscribed the scale, showing "hot," "warm," "tepid," and "cold" temperatures of water, the "freezing," "scalding," and boiling points of the same, and the points at which the mercury should stand when indicating the temperatures most suitable for the manufacture of cheese and butter, and for "fermenting" and "malting." Of course the plate $b$ might be inscribed with scales denoting other sets of points, these being selected only for convenience.

Hinged to the plate $b$ in any suitable manner is another plate, $c$, which comes in front of the plate $b$, and has a slot, $d$, through which the tube of the thermometer may be seen, and is inscribed with a Fahrenheit scale, on which are also denoted the points at which the temperature of green-houses should be kept for the culture of tropical plants and flowers; also the points at which the temperature of a hot-bed should be preserved for the rearing of different kinds of vegetables; and also the point at which the temperature of a sick room may advantageously be maintained.

The addition of these various tables to the ordinary thermometer-scale increases the utility of the instrument. Other tables than those here specified might no doubt be profitably added.

At the lower end of the plate $c$ is a curved plate or guard, $e$, which shuts in behind the plate $b$, and partially incloses and protects the bulb of the thermometer. The guard $e$, instead of being rigidly attached to the plate $c$, may be hinged thereto or to the plate $b$, so that only the guard need be turned to one side in order to expose the bulb when the operator desires to test the temperature of any liquid by inserting the bulb therein.

My improved thermometer may be made of convenient size for a pocket instrument.

Having thus described my invention,

What I claim as new, and desire to secure by Letters Patent, is—

The combination of the plate $c$, provided with the bulb-guard $e$, and inscribed with a suitable scale, as described, with the thermometer-plate $b$, and arranged so that either scale may be readily used, and the mercury-tube $a$ is incased as specified.

To the above specification of my invention I have signed my name this 18th day of October, A. D. 1870.

JOHN D. WARD.

Witnesses:
SOLON C. KEMON,
THOS. D. D. OURAND.